United States Patent
Chakarapani (10) Patent No.: US 8,528,039 B2
(45) Date of Patent: Sep. 3, 2013

(54) SYSTEM FOR AND METHOD OF SET-TOP BOX MEMORY MONITORING

(75) Inventor: Lakshmi N. Chakarapani, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 738 days.

(21) Appl. No.: 12/612,190

(22) Filed: Nov. 4, 2009

(65) Prior Publication Data

US 2011/0107389 A1 May 5, 2011

(51) Int. Cl.
*H04N 7/16* (2011.01)

(52) U.S. Cl.
USPC .......................... 725/144; 725/151; 711/170

(58) Field of Classification Search
USPC .................. 725/144, 151; 711/170
See application file for complete search history.

(56) References Cited

U.S. PATENT DOCUMENTS

| | | | |
|---|---|---|---|
| 2002/0141544 A1* | 10/2002 | Brown et al. | 379/29.01 |
| 2004/0268078 A1* | 12/2004 | Hassan | 711/170 |
| 2005/0076184 A1* | 4/2005 | Schumacher | 711/170 |
| 2005/0076394 A1* | 4/2005 | Watson et al. | 725/151 |
| 2007/0174917 A1* | 7/2007 | Guruswamy | 726/25 |

* cited by examiner

*Primary Examiner* — Nicholas Corbo (57) ABSTRACT

A system and method for monitoring set-top box memory is presented. In one exemplary embodiment, the system and method for monitoring set-top box memory may comprise receiving memory data of a set-top box at a central computing device, monitoring the memory data of the set-top box, analyzing the memory data, identifying a memory management issue, and performing one or more remedial actions in response to the identified memory management issue.

24 Claims, 4 Drawing Sheets

SYSTEM FOR AND METHOD OF SET-TOP BOX MEMORY MONITORING

BACKGROUND INFORMATION

A set-top box contains limited memory for application space. There is an increasing demand for set-top based applications. Many set-top box applications are written in languages that require manual memory management (e.g., languages that do not perform automatic garbage collection such as C and C++). Applications, utilities, and other programs written in languages that require manual memory management often contain memory leaks or other inefficient uses of resources. Memory leaks and other memory management issues can lead to crashing or rebooting of a set-top box, poor performance of a set-top box, and other issues.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An increasing number of applications is being developed for set-top boxes. Service providers, application developers, and others may want to test the performance of applications, operating systems, and other code running on a set-top box. According to one or more embodiments, a set-top box may gather data associated with memory usage of a set-top box. The data may be analyzed and one or more memory management issues may be identified. For example, a set-top box may transmit data or be queried for data by a central computing platform. The central computing platform may identify trends or issues with memory management of a set-top box.

Figure 1:
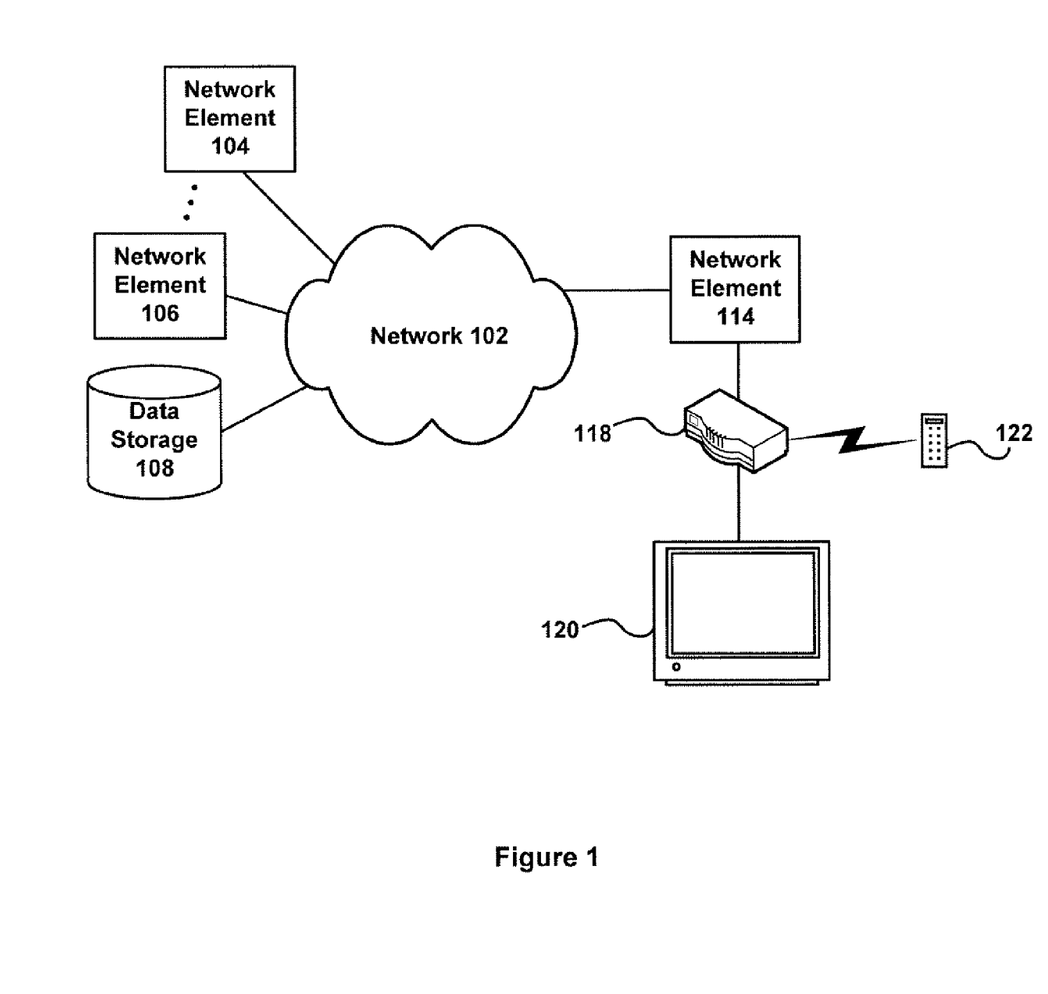
FIG. 1 is a schematic diagram illustrating a system for set-top box memory monitoring according to a particular embodiment.

FIG. 1 is a schematic diagram illustrating a system for set-top box memory monitoring according to a particular embodiment. As illustrated, network 102 may be communicatively coupled with one or more devices including network element 104, network element 106, data storage 108, and network element 114. Other devices may be communicatively coupled with network 102 via one or more intermediary devices. Set-top box 118 may be communicatively coupled with network 102 via network element 114. Wireless control 122 may be communicatively coupled with set-top box 118 via infrared, Bluetooth communication, or other wireless technologies. Television set 120 may be communicatively coupled to set-top box 118.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, and home networks.

Network elements 104, 106, 114, and data storage 108 may transmit and receive data to and from network 102 representing broadcast content, user request content, set-top box memory data, set-top box diagnostic information, diagnostic applications, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b and 802.11g. Network 102 may also use protocols for a wired connection, such as an IEEE Ethernet 802.3.

Network elements, data storage 108, and set-top box 118 may include one or more processors (not shown) for recording, transmitting, receiving, and storing data. Although network elements and data storage 108 are depicted as individual elements, it should be appreciated that the contents of one or more of a network element and data storage 108 may be combined into fewer or greater numbers of devices and may be connected to additional devices not depicted in FIG. 1. Furthermore, the one or more devices may be local, remote, or a combination thereof to a first network element and data storage 108.

Data storage 108 may be network accessible storage and may be local, remote, or a combination thereof to network elements 104 and 106. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

Network elements 104 and 106 may be one or more servers (or server-like devices), such as a Session Initiation Protocol ("SIP") server. According to one or more embodiments, network elements 104 and 106 may contain SNMP ("Simple Network Management Protocol") Managers and other network management tools. Network elements 104 and 106 may be servers of a service provider, the Internet, a broadcaster, a cable television network, or another media provider.

Network elements 104 and 106 may provide Application Programming Interfaces ("APIs"), interface tables, Remote Procedure Calls ("RPCs"), web services, Extensible Markup Language ("XML") based interfaces, Simple Object Access Protocol ("SOAP") based interfaces, Common Object Request Broker Architecture ("CORBA") and other interfaces for sending or receiving media searches, preferences or other information. Network elements 104 and 106 may provide data and receive data from one or more testing platforms or testing tools.

In one or more embodiments, network elements 104 and 106 may query one or more external sources of information to gather diagnostic information or utilities. For example, network elements 104 and 106 may gather information from an equipment manufacturer or a service provider specified web site. Additionally, network elements 104 and 106 may access other sources of information, such as a broadcaster's data store, a media production company data store, a media distribution company data store, or other data stores.

According to one or more embodiments, network element 114 may be a residential gateway, such as a router, an optical network terminal or another piece of Customer Premises Equipment ("CPE") providing access to one or more pieces of equipment. For example, network element 114 may provide audio/video programming content feeds to a set-top box, such as set-top box 120. Network element 114 may also provide network connectivity for other clients such as a Voice Over IP ("VOIP") phone and a network client.

According to one or more embodiments, set-top box 118 may contain different portions of memory. Portions of memory may be heaps, pools, or other categories of memory which may each be allocated for different purposes. For example, a portion of memory may be assigned to a system heap which may be utilized for running set-top applications. The system heap may also contain an operating system. A second portion may be a video heap which may be used for buffering and decoding video feeds. A third portion may be Mobile or Smart Card memory which may be used for cryptographic keys or identifiers to access or decrypt one or more portions of a video signal. A fourth portion may be assigned to a heap for a diagnostic application. Different amounts of memory may be allocated to different heaps and not all heaps may be present on set-top box 118. Additional portions of memory or heaps may be used in some embodiments. Memory heaps may be of different sizes for different embodiments. For example, a system heap may be allocated 303 MB, a video heap may be allocated 14 MB, Mobile or Smart Card memory may be 0.0039 MB, and a diagnostic application heap may be allocated 5 MB. Set-top box 118 may be configured to track memory usage for one or more heaps.

According to some embodiments set-top box 118 may store data associated with memory usage. Set-top box 118 may store data for specified parameters. The specified parameters may include total memory available for a heap, total memory used for a heap, total memory available for set-top box 118, total memory used for set-top box 118, memory used for a process, memory used for a thread, memory used for an application, and other memory usage parameters. According to some embodiments, set-top box 118 may store this data and may transmit one or more portions of data to a remote computing platform. According to one or more embodiments, set-top box 118 may store this data and may provide interfaces or APIs which may be used to query or retrieve one or more portions of this data. Data may include, by way of non-limiting example, information about memory usage, memory allocation, and other set-top box data. Data may be transmitted from set-top box 118 and not stored on set-top box 118.

Set-top box 118 may contain an SNMP Agent, another agent, or a process which may monitor one or more specified parameters associated with set-top box memory and other set-top box data, according to at least one embodiment. The SNMP Agent may store memory data in a Management Information Base ("MIB"). The monitored parameters may correspond to specified MIB parameters or variables. Memory data contained in a MIB may be sent to or queried by an SNMP manager, server-side application, or other component. For example, network element 106 may be an SNMP manager, server-side application, or other component which may receive memory data from set-top box 118. The SNMP agent or client on set-top box 118 may transmit data using syslog, httppost, ftp, or other protocols. Memory data may be transmitted periodically, such as for example, every thirty minutes. In some embodiments, memory data may not be recorded unless it meets a specified criteria. For example, memory data may be recorded when usage for an application, thread, process, heap, or box exceeds a certain percentage of memory available (e.g., 75%). Memory data may be recorded periodically and not transmitted unless it meets a specified criteria. According to some embodiments, memory data for a plurality of parameters may be recorded and only a portion of that data may be transmitted. For example, memory data may be recorded for one or more applications, threads, processes, heaps, or a set-top box and the set-top box may transmit only summary information. Summary information may be, for example, a total amount of memory available in a heap. Upon detection of an issue or meeting of a specified criteria, more detailed information may be transmitted or queried.

According to some embodiments, additional set-top box data may be transmitted. For example, set-top box hardware information or software information may be transmitted. Set-top box data may include one or more of: a serial number, connection information (e.g., the presence of and status of one or more connections), an image or footprint version identifier, set-top box component information, and application information (e.g., application name, version, file size, and a corresponding checksum). Additional set-top box data may be sent during setup and configuration of a set-top box, initialization or reboot of a set-top box, in response to a query, at periodic intervals, in response to a detected issue, and upon the meeting of one or more criteria.

The level of memory detail recorded and transmitted may be configured. For example, a service provider may configure a set-top box in a test environment to record a large amount of detailed memory information. A set-top box in a production environment may record less information. According to at least one embodiment, a set-top box in a production environment may record a first level of memory data which may include summary information. If a flag is set or a criteria is met a set-top box may record a second level of memory data which may include more detail and may be used for diagnostic purposes.

Network element 106 may contain a SNMP manager, a server-side application, or another component or module which may query or receive memory data from set-top box 118. According to some embodiments, network element 106 may receive data periodically from a MIB on set-top box 118 via syslog, httppost, or other protocols. For example, an SNMP agent, a client, or other process running on set-top box 118 may use SNMP TRAP or INFORM protocol operations to send data to a SNMP manager, server-side application, or other component on network element 106. According to one or more embodiments, network element 106 may query one or more set-top boxes, such as set-top box 118. A SNMP manager running on network element 106 may use GET, GETNEXT, GETBULK or other SNMP protocol operations to query set-top box 118. Similarly, a server-side application, or another component or module may query the set-top box to retrieve information.

A set-top box being queried by a remote SNMP manager, server-side application, or other component may be on a private LAN (e.g., the network behind network element 114). Port forwarding may be configured on a residential gateway, a router, CPE, or an optical network terminal. For example, network element 114 may be a residential gateway and port forwarding may be configured on network element 114. This may allow an SNMP manager, server-side application, or other component on network element 106 to query one or more set-top boxes on a private LAN behind network element 114 such as, for example, set-top box 118.

A SNMP manager, server-side application, or other component on network element 106 may receive memory data in one or more formats including text, XML, and other formats. One or more portions of transmitted memory data may be encrypted or otherwise encoded. Network element 106 may perform one or more operations on received data including, but not limited to, conversion, parsing, translation, storage, analysis, reporting, and alerting. For example, network element 106 may analyze memory data from a single set-top box associated with a particular heap, thread, process or application on that set-top box. Increasing memory usage by an application, thread, process, heap, or other allocation of memory may be identified as an issue. For example, increasing memory usage associated with an application, thread, or process may indicate a memory leak. Other memory data may be analyzed such as, by way of non-limiting example, error data, stack trace data, stack dump data, core dump data, debug data, and processor register data. Network element 106 may generate charts, reports, and other outputs to analyze data. For example, network element 106 may produce a line graph showing historical memory usage of one or more components of set-top box 118. Network element 106 may export data in one or more formats, transmit data, or provide APIs or interfaces to data. For example, network element 106 may export data into a format used by a spreadsheet such as a comma separated value or XLS format. Network element 106 may translate received XML formatted data and store the data for analysis. According to some embodiments, data storage 108 may be used by network element 106 for storage, retrieval, distribution, and analysis of data.

Analysis of set-top box data may prompt one or more actions. For example, analysis of set-top box data may identify an issue and a remedial action or a diagnostic action. Diagnostic actions may include requesting one or more portions of set-top box data, running one or more diagnostic routines, and downloading one or more utilities to a set-top box. A diagnostic action may obtain a set-top box footprint, revision, or other information and compare the information against a database or other storage containing diagnostic information, troubleshooting information, or known issues. A diagnostic action may include comparing a profile of a set-top box with a previously obtained profile or with a profile of one or more other set-top boxes. A profile may include a base image or information about software, hardware, settings, running processes, memory usage, and other set-top box data. Remedial actions may include terminating, suspending, or resetting one or more processes, applications, and threads. Remedial actions may also include resetting a set-top box, rebooting a set-top box, restoring default settings of a set-top box, flashing EEPROM (Electrically Erasable Programmable Read-Only Memory), and resetting BIOS (Basic Input/Output System). Remedial actions may also include downloading and installing a software patch, a software upgrade, or a different version of software on a set-top box. Remedial actions may include uninstalling one or more portions of software or adjusting settings.

Data storage 108 may be a relational database that may store set-top box memory data and other set-top box data. Data may be aggregated, sorted, processed, and queried to identify memory trends, problems, and other issues. For example, memory data associated with a particular application, thread, or process may be grouped to identify one or more issues. According to some embodiments, data storage 108 may provide one or more APIs or other interfaces which may be used by a web server or other application to distribute, present, and share information.

Memory monitoring may be performed for different purposes. For example, memory monitoring may be performed on a group of set-top boxes being used to test a set-top box application prior to a general release or certification of the application. Memory monitoring may also be used to diagnose problems in a production system. Network element 104 may be a testing device which may be used to generate simulated commands to set-top box 118 and other set-top boxes as part of a testing process. Test patterns may be run including launching one or more applications, changing channels, navigating menus, and performing other set-top box functionality. Network element 104 may allow the automated running of test patterns that may issue thousands of commands to a set-top box. This may allow the testing of a set-top box application, operating system, or other components in a short period of time. The test patterns, however, may emulate an extended usage pattern for a set-top box as actually used in production. This may allow the identification of small memory leaks which may build over time as a user leaves a set-top box powered on.

Set-top box memory monitoring and the monitoring and acquisition of other set-top box data may be prioritized according to the severity of an issue, the number of occurrences of an issue (e.g., frequency on a particular set-top box, frequency among total set-top boxes, frequency within a region or other classifications), the duration of an issue, the clients affected by an issue, or other factors. Set-top box data such as, for example, data associated with memory, hardware specifications, software version information, footprint, a location of a set-top box, bandwidth associated with a set-top box, or other set-top box characteristics may be used to group, classify, or profile set-top boxes. A profile of set-top boxes may be used to isolate the cause of an issue, a fix, or for other diagnostic or remedial measures. Historical footprints or profiles of set-top boxes may be used to compare with a current footprint or profile to isolate changes in a set-top box. According to some embodiments, set-top boxes may be grouped into supported footprints, releases, or profiles. Deviations from supported footprints, releases, or profiles may be detected and analyzed. Detection of a component that is not supported (e.g., installed unsupported software) may trigger one or more remedial actions. For example, if a set-top box is performing poorly as measured by one or more specified criteria, removal of one or more unsupported components may occur. As another example, a message associated with the performance issue and an unsupported component may be provided to an administrator or a user (e.g., via email, a webpage, or an on-screen error message). Set-top box data may be analyzed across groups of set-top boxes to identify hardware, issues, operating system issues, application issues, or bandwidth issues.

The various components of system 100 as shown in FIG. 1 may be further duplicated, combined and/or integrated to support various applications and platforms. Additional elements may also be implemented in the systems described above to support various applications.

Figure 2:
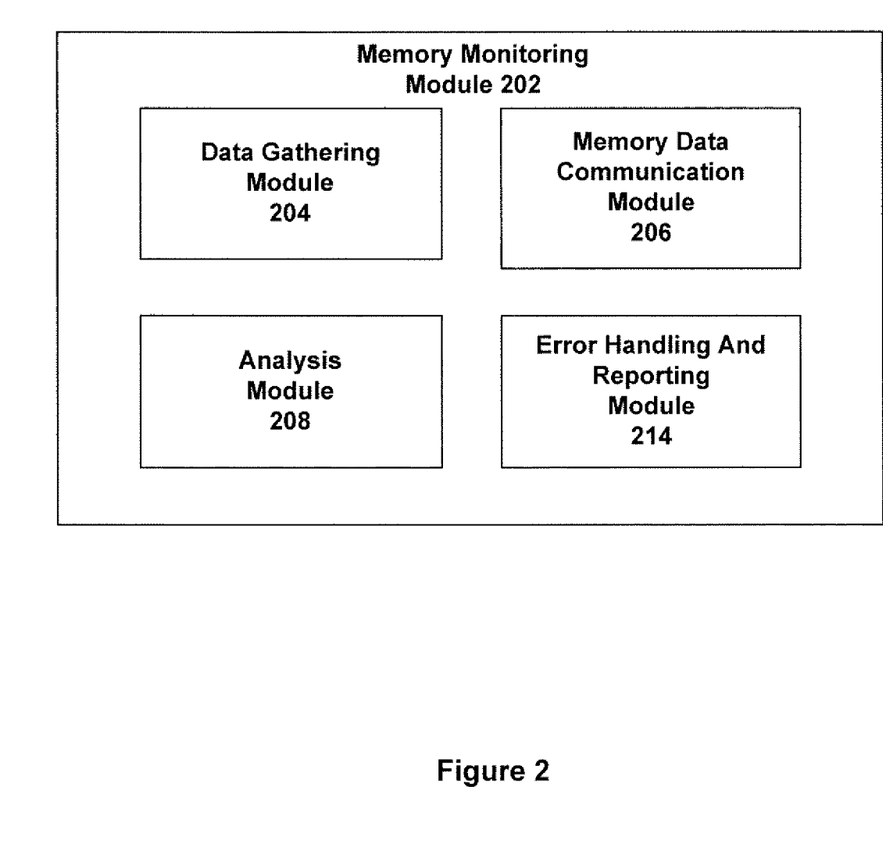
FIG. 2 is a block diagram of a hardware component of the system for set-top box memory monitoring of a particular embodiment.

FIG. 2 is a block diagram of a hardware component of the system for set-top box memory monitoring of a particular embodiment. Referring to FIG. 2, there is shown a memory monitoring module 202 for managing set-top box memory in accordance with an embodiment of the present disclosure. As illustrated, the memory monitoring module 202 may contain one or more components including data gathering module 204, memory data communication module 206, analysis module 208, and error handling and reporting module 214. Although memory monitoring module 202 is depicted as a single module, functionality or modules of memory monitoring module 202 may be located on a single device or distributed across a plurality of devices including one or more centralized servers and one or more pieces of customer premises equipment or end user devices.

Data gathering module 204 may gather data associated with set-top box memory. Data may be gathered by a set-top box and stored. The amount and types of data gathered may be specified by parameters or variables. According to some embodiments, data gathering module 204 may use a MIB for local storage on a set-top box. According to at least one embodiment, data may be gathered only when a parameter or variable meets a specified criteria or when an indicator is set. For example, application memory usage may be tracked or gathered when the usage exceeds a specified percentage.

Memory data communication module 206 may receive data from or query data from data gathering module 204. Memory data communication module 206 may use a SNMP method to query data such as GET, GETNEXT, GETBULK or other SNMP protocol operations. When querying data memory data communication module 206 may use port forwarding on a router, residential gateway, or other network device to reach one or more set-top boxes on a private LAN. Memory data communication module 206 may also receive data transmitted via syslog, http, httppost, ftp, or other protocols.

Analysis module 208 may perform one or more of parsing, transformation, conversion, translation, storage, analysis, and alerting associated with one or more portions of memory data. Analysis module 208 may perform statistical analysis, apply one or more algorithms, and analyze trends. Analysis module 208 may also isolate memory usage issues and errors such as, for example, processes, threads, or applications associated with a core dump, stack trace, or stack dump. Analysis module 208 may identify one or more memory leaks in an application, a widget, an operating system, a utility, or other executable code running on a set-top box. According to some embodiments, analysis module 208 may be run in a testing environment and may correlate memory data with test patterns. For example, analysis module 208 may provide information showing an increasing amount of memory being used on a set-top box in a heap and may correlate this trend with a test pattern being run on the set-top box. Analysis module 208 may also convert between data received in an XML format to data stored in a relational database.

Error handling and reporting module 214 may handle one or more errors associated with set-top box applications, threads, processes, memory monitoring, and memory analysis. Error handling and reporting module 214 may provide alerts or messages to administrators in the event of an error. Error handling and reporting module 214 may produce one or more reports including error reports, such as reports memory usage for one or more components of a set-top box over a periodic interval, memory usage over a period of time for an application on a group of set-top boxes, memory usage associated with a core dump, memory usage associated with a stack trace, and memory usage associated with a stack dump.

Figure 3:
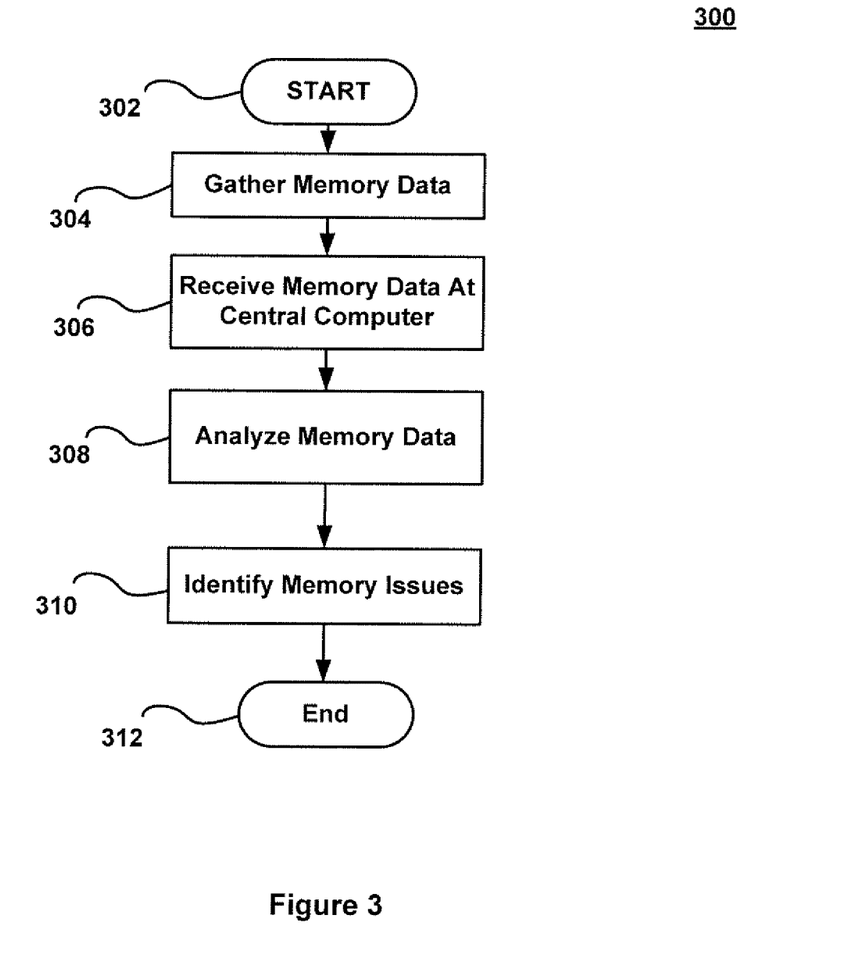
FIG. 3 is a flowchart illustrating a method for set-top box memory monitoring according to a particular embodiment.

FIG. 3 is a flowchart illustrating a method for set-top box memory monitoring according to a particular embodiment. At block 302, the method 300 for set-top box memory monitoring may begin.

At block 304, memory data and other set-top box data may be gathered by a set-top box. According to some embodiments, memory data may be gathered by an SNMP agent or another client on a set-top box. Memory data may be stored in one or more structures on the set-top box such as, for example, a MIB. The quantity, type, and frequency of data gathering may be determined by one or more specified parameters.

At block 306, memory data and other set-top box data may be received at a central computer. Memory data may be transmitted by a set-top box to the central computer or the central computer may query memory of the set-top box. For example a central computer may contain a SNMP manager, server-side application, or other component and may use a SNMP method to query data such as GET, GETNEXT, GETBULK or other SNMP protocol operations. When querying data a central computer may use port forwarding on a router, residential gateway, or other network device to reach one or more set-top boxes on a private LAN. A central computer may also receive data transmitted via syslog, http, httppost, ftp, or other protocols.

At block 308, memory data may be analyzed by a central computer or by one or more other components communicatively coupled to the central computer. According to one or more embodiments, one or more portions of analysis may be performed by a set-top box. One or more operations may be performed on received data including, but not limited to, conversion, parsing, translation, storage, analysis, reporting, and alerting. For example, a central computer may analyze memory data from a single set-top box associated with a particular, heap, thread, process or application on that set-top box. Increasing usage for an application, thread, process, heap, or other allocation of memory may be identified as an issue. For example, increasing memory usage associated with an application, thread, or process may indicate a memory leak. Other memory data may be analyzed such as, by way of non-limiting example, error data, stack trace data, stack dump data, core dump data, debug data, and processor register data. The central computer or another component communicatively coupled to the central computer may generate charts, reports, and other outputs to analyze data. For example, the central computer or another component communicatively coupled to the central computer may produce a line graph showing historical memory usage of one or more components of a set-top box. The central computer or another component communicatively coupled to the central computer may export data in one or more formats, transmit data, or provide APIs or interfaces to data.

At block 310, one or more memory issues may be identified. Memory issues may include errors, leaks, slow performance, excessive memory use, and other issues. According to some embodiments, one or more actions may be performed in response to an identified issue. Actions may include, for example, remedial actions and diagnostic actions. Diagnostic actions may include requesting one or more portions of set-top box data, running one or more diagnostic routines, and downloading one or more utilities to a set-top box. A diagnostic action may obtain a set-top box footprint, revision, or other information and compare the information against a database or other storage containing diagnostic information, troubleshooting information, or known issues. A diagnostic action may include comparing a profile of a set-top box with a previously obtained profile for that set-top box or with a profile of one or more other set-top boxes. A profile may include a base image or information about software, hardware, settings, running processes, memory usage, and other set-top box data. Remedial actions may include terminating, suspending, or resetting one or more processes, applications, and threads. Remedial actions may also include resetting a set-top box, rebooting a set-top box, restoring default settings of a set-top box, flashing EEPROM (Electrically Erasable Programmable Read-Only Memory), and resetting BIOS (Basic Input/Output System). Remedial actions may further include downloading and installing a software patch, a software upgrade, or a different version of software on a set-top box. Remedial actions may include uninstalling one or more portions of software or adjusting settings.

At block 312, the method 300 may end.

Figure 4:
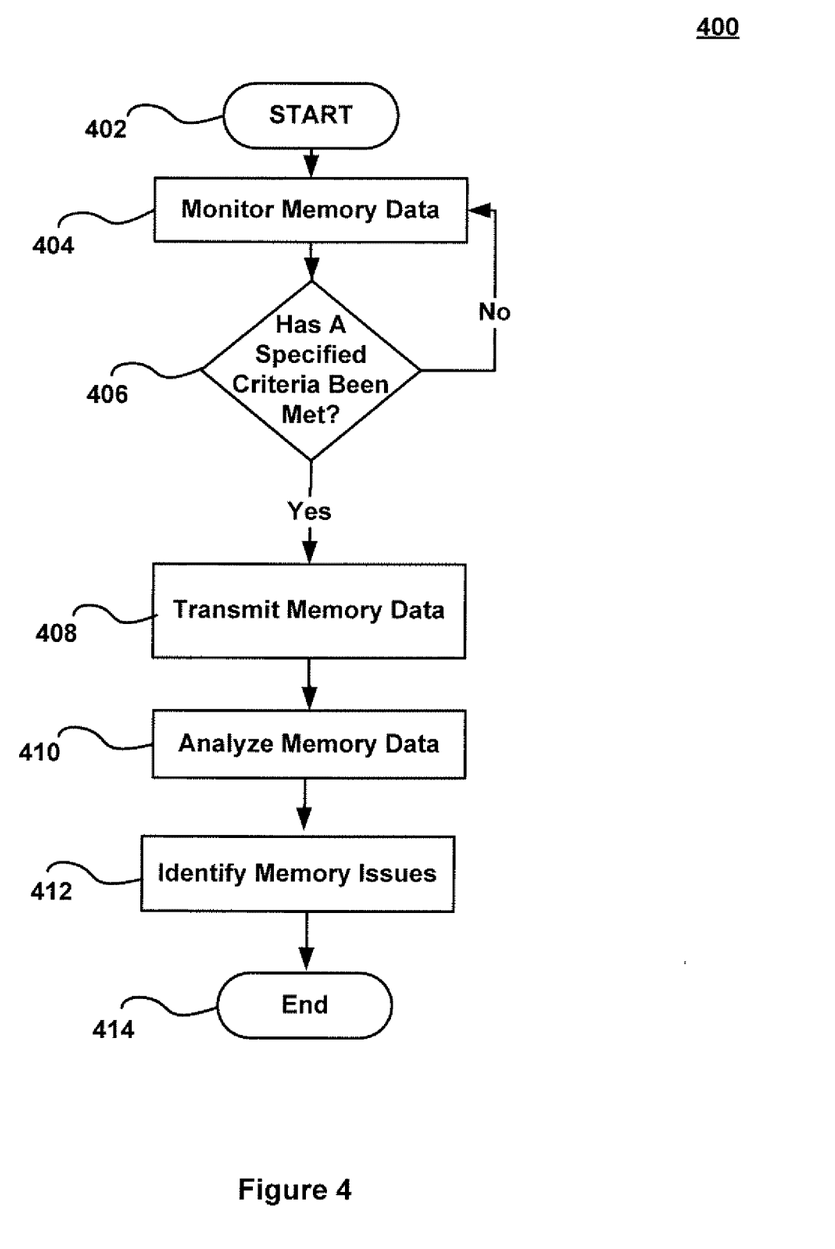
FIG. 4 is a flowchart illustrating a method for set-top box memory monitoring of a particular embodiment.

FIG. 4 is a flowchart illustrating a method for set-top box memory monitoring of a particular embodiment. At block 402, the method 400 for set-top box memory monitoring may begin.

At block 404, memory data of a set-top box may be monitored.

At block 406, the method 400 may determine whether a specified criteria has been met. One or more specified criteria may be contained on a set-top box including, but not limited to, a percentage of overall memory used, a percentage of overall memory free, a percentage of memory used in a heap, a percentage of memory free in a heap, a quantity of memory used by a thread, a quantity of memory free, and a combination of the preceding. If one or more criteria have been met the method 400 may continue at block 408. If one or more criteria have not been met, the method 400 may return to block 404.

At block 408, memory data may be transmitted. Memory data may be transmitted by a set-top box to the central computer or the central computer may query memory of the set-top box. For example a central computer may contain a SNMP manager, server-side application, or other component and may use a SNMP method to query data such as GET, GETNEXT, GETBULK or other SNMP protocol operations. When querying data a central computer may use port forwarding on a router, residential gateway, or other network device to reach one or more set-top boxes on a private LAN. A central computer may also receive data transmitted via syslog, http, httppost, ftp, or other protocols. According to some embodiments, a central computer may receive summary data transmitted from a set-top box and may query the set-top box for additional data after analyzing the summary data.

At block 410, memory data may be analyzed by a central computer or by one or more other components communicatively coupled to the central computer. According to one or more embodiments, one or more portions of analysis may be performed by a set-top box. One or more operations may be performed on received data including, but not limited to, conversion, parsing, translation, storage, analysis, reporting, and alerting. For example, a central computer may analyze memory data from a single set-top box associated with a particular, heap, thread, process or application on that set-top box. Increasing usage for an application, thread, process, heap, or other allocation of memory may be identified as an issue. Increasing memory usage associated with an application, thread, or process may indicate a memory leak. A central computer may also compare set-top box data with a stored profile of the set-top box or with a profile of other set-top boxes. For example, a type of set-top box configuration may be classified as a footprint or base image which specifies installed software, operating system, hardware, and settings for a set-top box. Diagnostic or remedial actions may be performed on a set-top box that does perform well compared to other set-top boxes with a similar or identical profile. Profiles may also be used to identify issues or trends across groups of set-top boxes.

At block 412, one or more memory issues may be identified. Memory data of a set-top box may be analyzed to identify an increase in memory usage, a hung process, a crashed process or application, a low level of available memory, and other issues. According to some embodiments, a base image of a set-top box may be compared against newly received data. Memory issues may include errors, leaks, slow performance, excessive memory use, and other issues. According to some embodiments, one or more actions may be performed in response to an identified issue. Actions may include, for example, remedial actions and diagnostic actions. Diagnostic actions may include requesting one or more portions of set-top box data, running one or more diagnostic routines, and downloading one or more utilities to a set-top box. A diagnostic action may include obtaining a set-top box footprint, revision, or other information and comparing the information against a database or other storage containing diagnostic information, troubleshooting information, or known issues. A diagnostic action may include comparing a profile of a set-top box with a previously obtained profile for that set-top box or with a profile of one or more other set-top boxes. A profile may include a base image or information about software, hardware, settings, running processes, memory usage, and other set-top box data. Remedial actions may include terminating, suspending, or resetting one or more processes, applications, and threads. Remedial actions may also include resetting a set-top box, rebooting a set-top box, restoring default settings of a set-top box, flashing EEPROM (Electrically Erasable Programmable Read-Only Memory), and resetting BIOS (Basic Input/Output System). Remedial actions may further include downloading and installing a software patch, a software upgrade, or a different version of software on a set-top box. Remedial actions may include uninstalling one or more portions of software or adjusting settings.

At block 414, the method 400 may end.

It is further noted that the software described herein may be tangibly embodied in one or more computer-readable physical media, such as, but not limited to, a compact disc ("CD"), a digital versatile disc ("DVD"), a floppy disk, a hard drive, read only memory ("ROM"), random access memory ("RAM"), as well as other computer-readable physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

I claim:

1. A method, comprising:
    receiving memory data of a memory in a set-top box at a central computing device;
    analyzing the memory data;
    identifying, from the analysis of the memory data, a memory management issue associated with the set-top box memory, wherein a memory manager on the central computing device queries the set-top box for further memory data in response to the identified memory management issue, wherein the further memory data is more detailed than the received memory data; and
    performing one or more remedial actions related to the set-top box in response to the identified memory management issue.

2. The method of claim 1, wherein the one or more remedial actions comprise at least one of:
    terminating a thread at the set-top box, suspending a thread, terminating an application at the set-top box, resetting the set-top box, rebooting the set-top box, restoring default settings of the set-top box, flashing EEPROM (Electrically Erasable Programmable Read-Only Memory) of the set-top box, installing software on the set-top box, uninstalling one or more portions of software from the set-top box, and adjusting a setting of the set-top box.

3. The method of claim 1, wherein analyzing the memory data comprises using data from a plurality of set-top boxes in the analysis.

4. The method of claim 1, wherein the memory data comprises Management Information Base (MIB) data.

5. The method of claim 4, wherein the memory data is queried by a Simple Network Management Protocol (SNMP) manager on the central computing device.

6. The method of claim 5, further comprising querying memory data from a plurality of set-top boxes using port forwarding.

7. The method of claim 1, further comprising:
    monitoring the memory data of the set-top box;
    measuring a portion of the set-top box memory data against one or more specified criterion; and
    transmitting the portion of the set-top memory data in the event its meets the one or more specified criterion.

8. The method of claim 7, wherein the one or more specified criterion comprises at least one of: a percentage of overall memory used in the set-top box, a percentage of overall memory free in the set-top box, a percentage of memory used in a heap of the set-top box memory, a percentage of memory free in a heap of the set-top box memory, a quantity of memory used by a thread of the set-top box memory, a quantity of memory free, and a combination of the preceding.

9. The method of claim 1, wherein the memory data is structured using XML.

10. The method of claim 9, wherein the received memory data is stored in a relational database.

11. The method of claim 1, wherein the memory data comprises at least one of stack trace data, stack dump data, error data, core dump data, debug data, and processor register data.

12. The method of claim 1, further comprising generating one or more outputs based on the memory data, wherein the one or more outputs include at least one of a report and an alert to at least one of an administrator or user.

13. A non-transitory computer readable media comprising code to perform the acts of the method of claim 1.

14. A system, comprising:
    a set-top box communicatively coupled to a network;
    a central computing device communicatively coupled to a network, wherein the central computing device comprises one or more processors configured to:
        receive memory data of a memory in the set-top box;
        analyze the memory data;
        identify, from the analysis of the memory data, a memory management issue associated with the set-top box memory, wherein a memory manager on the central computing device queries the set-top box for further memory data in response to the identified memory management issue, wherein the further memory data is more detailed than the received memory data; and
        perform one or more remedial actions in response to the identified memory management issue.

15. The system of claim 14, wherein the one or more remedial actions comprise at least one of:
    terminating a thread at the set-top box, suspending a thread, terminating an application at the set-top box, resetting the set-top box, rebooting the set-top box, restoring default settings of the set-top box, flashing EEPROM (Electrically Erasable Programmable Read-Only Memory) of the set-top box, installing software on the set-top box, uninstalling one or more portions of software from the set-top box, and adjusting a setting of the set-top box.

16. The system of claim 14, wherein analyzing the memory data comprises using data from a plurality of set-top boxes in the analysis.

17. A system, comprising:
    a network element communicatively coupled to a network wherein the network element comprises one or more processors configured to:
        receive memory data of a memory in the set-top box;
        analyze the memory data;
        identify, from the analysis of the memory data, a memory management issue associated with the set-top box memory, wherein a memory manager on the network element queries the set-top box for further memory data in response to the identified memory management issue, wherein the further memory data is more detailed than the received memory data; and
        perform one or more remedial actions in response to the identified memory management issue.

18. The system of claim 17, wherein the one or more remedial actions comprise at least one of:
    terminating a thread at the set-top box, suspending a thread, terminating an application at the set-top box, resetting the set-top box, rebooting the set-top box, restoring default settings of the set-top box, flashing EEPROM (Electrically Erasable Programmable Read- Only Memory) of the set-top box, installing software on the set-top box, uninstalling one or more portions of software from the set-top box, and adjusting a setting of the set-top box.

19. The system of claim 17, wherein analyzing the memory data comprises using data from a plurality of set-top boxes in the analysis.

20. The method of claim 1, wherein the received memory data comprises summary information of the memory in the set-top box.

21. The method of claim 1, wherein analyzing the memory data comprises comparing a profile of the set-top box with one or more previously obtained profiles of the set-top box, wherein a profile of a set-top box comprises at least one of information about software, hardware, settings, running processes, or memory usage of the set-top box at a specific moment in time.

22. The method of claim 21, wherein analyzing the memory data further comprises comparing the profile of the set-top box with one or more previously obtained profiles of a group of one or more other set-top boxes, wherein the group of one or more other set-top boxes is selected based on at least one of hardware, software, memory data, bandwidth, footprint, and location associated with the group of one or more other set-top boxes.

23. The method of claim 21, wherein the one or more remedial actions are further based on a result of comparing the profile of the set-top box with one or more previously obtained profiles of the set-top box.

24. The method of claim 1, further comprising identifying a memory leak based on an identified increased usage of at least one of an application, thread, heap, or process of the set-top box.

* * * * *